US005377835A

United States Patent [19]

Cornelissen et al.

[11] Patent Number: 5,377,835

[45] Date of Patent: Jan. 3, 1995

[54] RECLOSABLE FILM PACKAGE

[75] Inventors: Herman L. Cornelissen, Aartselaar; Dirk Peeters, Kontich, both of Belgium

[73] Assignee: AGFA-Gevaert N. V., Mortsel, Belgium

[21] Appl. No.: 130,423

[22] Filed: Oct. 1, 1993

Related U.S. Application Data

[63] Continuation of Ser. No. 890,251, May 29, 1992.

[30] Foreign Application Priority Data

Jun. 18, 1991 [BE] Belgium .......................... 91201539.3

[51] Int. Cl.[6] .............................................. G03B 42/04

[52] U.S. Cl. ...................................... 206/455; 378/184

[58] Field of Search ....................... 383/122, 119, 104; 206/455, 456, 454, ; 354/276, 277; 378/184

[56] References Cited

U.S. PATENT DOCUMENTS

| | | | |
|---|---|---|---|
| 3,123,209 | 3/1964 | Burket et al. | 206/455 |
| 3,443,093 | 5/1969 | Lindenmuth et al. | 206/455 X |
| 4,552,268 | 11/1985 | Lee | 206/455 |
| 4,955,479 | 9/1990 | Beer et al. | 206/455 |
| 5,048,686 | 9/1991 | Kausch et al. | 206/455 |
| 5,139,148 | 8/1992 | Peeters et al. | 206/455 |

*Primary Examiner*—Jacob K. Ackun, Jr.
*Attorney, Agent, or Firm*—Daniel William J.

[57] ABSTRACT

A reclosable film package (10) with a pack (15) of film sheet wrapped in a light-tight bag with an egress flap (16) folded back on the stack and having a light-tight seal (17) near its free end, and a rectangular carton (11) for enclosing the pack made from a one-piece erectable blank and having a top end opening (12) closeable by means of a hinged top end panel (13).

8 Claims, 4 Drawing Sheets

FIG. 4a
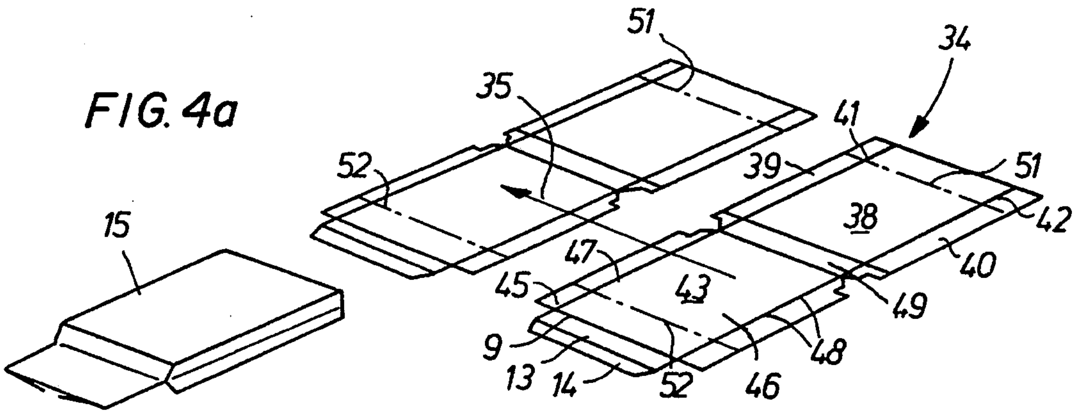
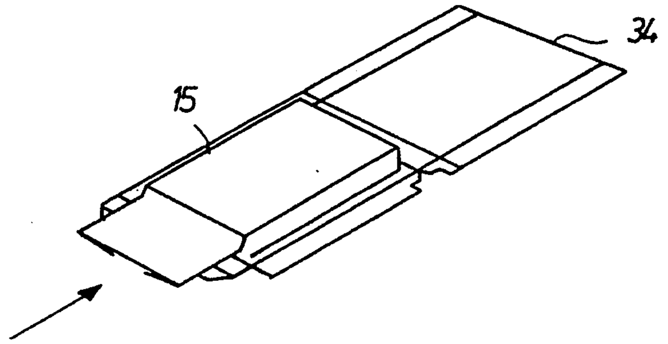
FIG. 4b
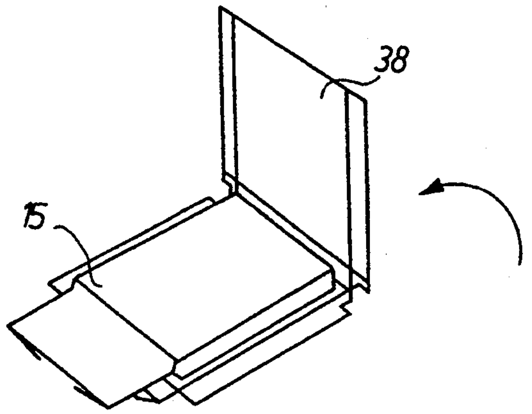
FIG. 4c
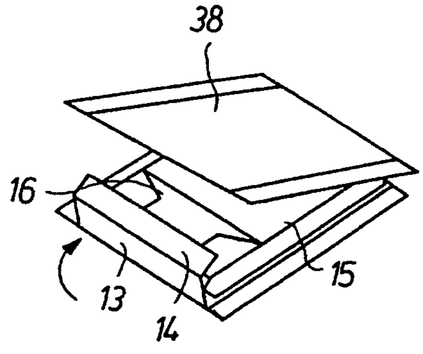
FIG. 4d

RECLOSABLE FILM PACKAGE

This application is a continuation of application Ser. No. 07/890,251, filed May 29, 1992.

BACKGROUND OF THE INVENTION

1. Field of the Invention

The present invention relates to a reclosable film package for a stack of photographic film sheets, in particular for medical X-ray films.

2. Description of the Prior Art

Medical X-ray film sheets that require a darkroom for their loading in an X-ray film cassette for their exposure, or in the magazine of a daylight loader for automatic reloading of a cassette as an image-wise exposed film has been removed therefrom, are packed in different forms.

One package form comprises a stack of film sheets wrapped in a light-tight and moisture-tight bag that can be teared open in a controlled way. The bag is contained in a telescope-type carton comprising an inner carton in the form of an open rectangular holder and a two-part outer carton, the lower part being glued to the inner carton and the upper part forming a cover that telescopes over the protruding part of the inner carton. The described carton allows the light-tight storage of the film once the bag has been opened.

Another package form comprises a stack of film sheets wrapped in a bag as described hereinbefore but contained in a one-piece carton, the top of which is delimitated by a weakened peripheral line so that it can easily be peeled away thereby to open the carton. Then the bag can be torn open to give access to the film sheets. This package can not be re-closed after opening, so that so-called "bins" are required, i.e. light-tight cabinets or slides for protected the opened packages from light when the room is lit. The advantages of this package over the first type described are its simple and cheap manufacture inasmuch as the one-piece carton may be a wrap-around carton and its reduced environmental burden when the empty package is discarded.

SUMMARY OF THE INVENTION

Object of the Invention

It is the object of the present invention to provide a single carton type film package that is economical to manufacture but that nevertheless is suited for keeping the film contents light-tight after the package has been opened.

In accordance with the present invention, a reclosable film package comprises a stack of film sheets wrapped in a light-tight bag with an exit extension in the form of a flap folded back on the stack and light-tightly sealed near its free end and for enclosing the wrapped stack of sheets, a rectangular carton having a top end opening closeable by means of a top end panel hingedly connected to an edge of the top end opening.

At first use of the package, the user opens the top end panel and removes the bag at least partly from the carton. He unfolds the flap, opens the light-tight seal of the bag and takes out the required number of film sheets from the bag for loading the film cassettes or film magazines. Then he folds back the flap thereby sealing the contents of the bag against light and re-inserts the bag into the carton to keep the flap backfolded. Then he closes the top end panel for further improving the light-tightness of the contents.

The carton of the inventive package is preferably a one-piece wrap-around carton formed set up in situ around the film pack consisting of the stack of film sheets and their wrapping bag. To that end, an appropriately creased and cut blank may be used, comprising a rear panel having on opposite sides thereof side panels connected along fold liens, a bottom end panel connected along fold lines with the rear and the front panel respectively and a top end panel formed as a flap connected along a fold line with the rear panel. The described blank is placed on a transport belt or the like and the film pack is put on the rear panel. Next the top end panel is folded against the filmpack, a locking tab of the top panel becoming located on the front side of the filmpack, and then the front panel is folded over the film pack whereby the bottom panel becomes applied against the bottom of the film pack and the locking tab of the top end panel is clamped between the front panel and the film pack. Finally, the corresponding side panels are folded and adhesively bonded together. The finished package may receive a warranty sealing label on its top panel.

Suitable features of the film package according to the invention are as follows.

The light-tight seal of the filmbag is formed on the extension flap thereat by a peelable heat-seal. This has the advantage that the package is not only light-tightly but also air-tightly sealed, and that yet the seal may be opened without destruction of the flap so that the flap may be folded back for forming a light-tight seal again.

The seal is located sufficiently inward of the peripheral edge of the free end of the flap to allow easy grasping of the end margin of the flap for peeling open the seal.

The peelable seal of the filmbag has a sawtooth-like or sinuous form. This has the advantage that opening of the seal does not only occur in a transverse direction with respect to the seal, but also in a direction comprising a component running parallel therewith, so that a smooth opening of the seal with less effort is obtained.

Alternatively, the end of the flap of the bag may be folded several times to form a labyrinthlike closure that is kept closed by a sealing strip or a warranty label.

The front, rear, and side walls adjacent the top end of the carton can be provided with a weakened circumferential line enabling the controlled removal of a top portion of the carton. The shell thus formed has the advantage that it forms a handy holder for a film pack from which one or more film sheet can be taken out rapidly without having to open the top end panel and pull out the film pack to unfold the flap of the bag. The light-tightness of such wrapping is still guaranteed by the back-folded flap, but nevertheless the package should be handled with car since the second light-lock formed by the carton is missing.

In another way, the film sheets can be taken out from the bag and placed in the remaining shell of the carton. This way of keeping the film sheet greatly facilitates their accessibility but requires the use of a bin.

BRIEF DESCRIPTION OF THE DRAWINGS

The invention will be described hereinafter by way of example with reference to the accompanying drawings wherein:

FIG. 4 shows the enclosing of the film pack in the outer carton.

DETAILED DESCRIPTION OF THE INVENTION

Figure 1:
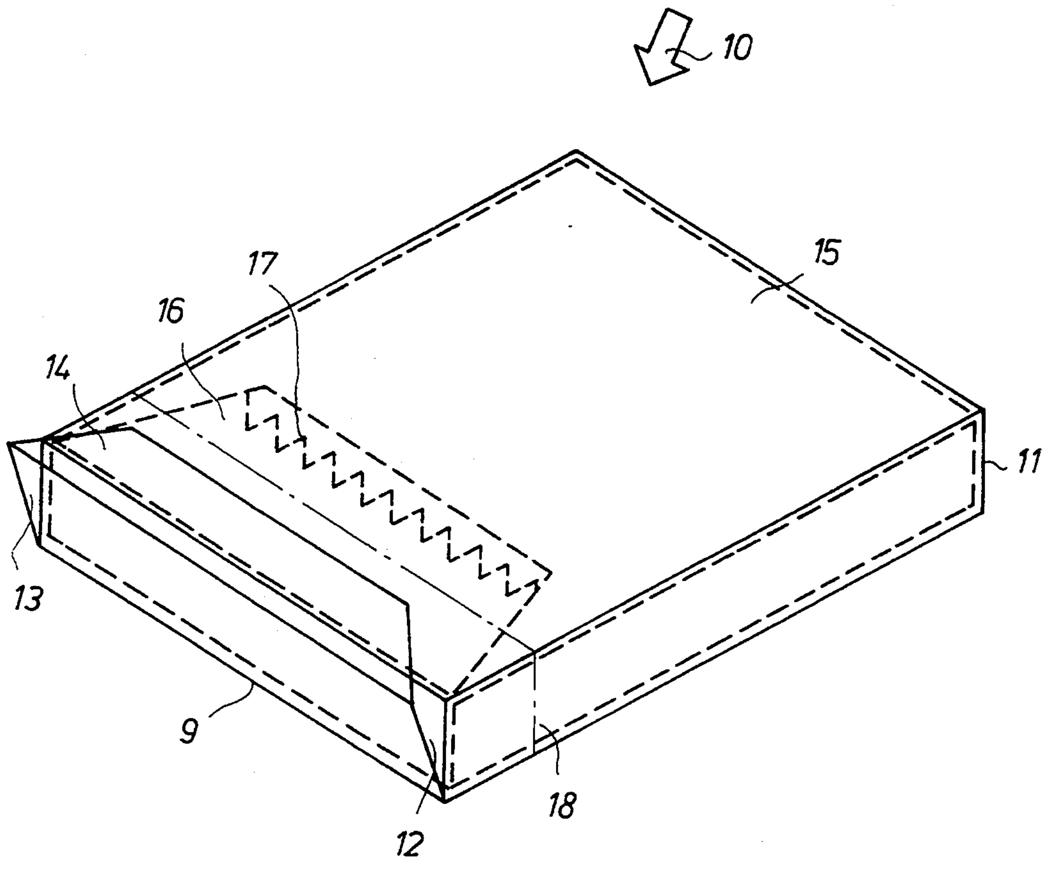
FIG. 1 is a perspective view of one embodiment of a film package according to the invention.

FIG. 1 shows diagrammatically one embodiment of a recloseable film package 10 according to the invention.

Rectangular carton 11, represented in solid lines, is made from a one-piece blank of corrugated paperboard and has a top opening 12 closeable by a top end panel or flap 13 with a locking tab 14. The top panel is hingedly connected to the edge 9 of opening 12 and has been shown in partly open position for the sake of clarity, and for the same reason the carton has been shown in the drawings in solid lines with the wrapped film pack 15 shown in broken lines. The film pack consists of a light-tight bag with a flap-like extension 16 folded back on the pack as shown. The flap forms the exit opening of the bag and is light-tightly and air-tightly sealed by a sawtooth-like seal 17. A suitable material for the bag is a laminate consisting of the following layers in superposition: paper, aluminium and black peelable polyethylene.

The carton is finally provided with a weakened circumferential line 18 for occasional removal of the upper portion of the carton.

The assembling of the film package is described hereinafter.

Figure 2A:
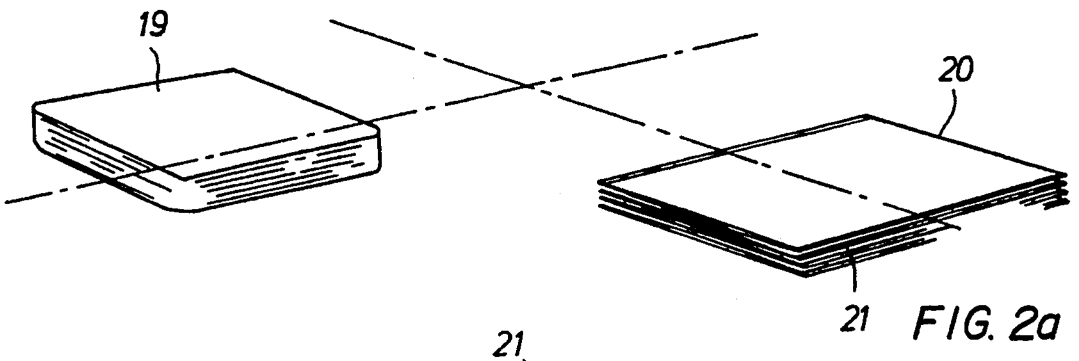
FIG. 2 shows different stages in the wrapping of a stack of film sheets in a bag.
Figure 2B:
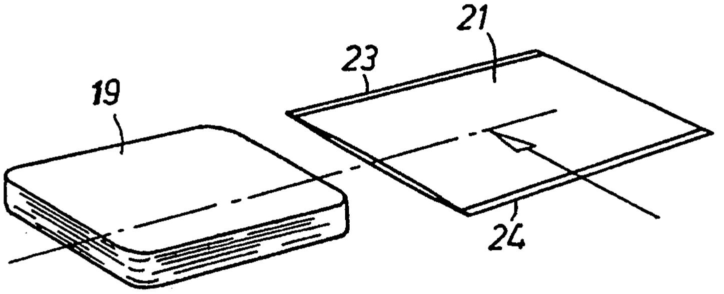
Figure 2C:
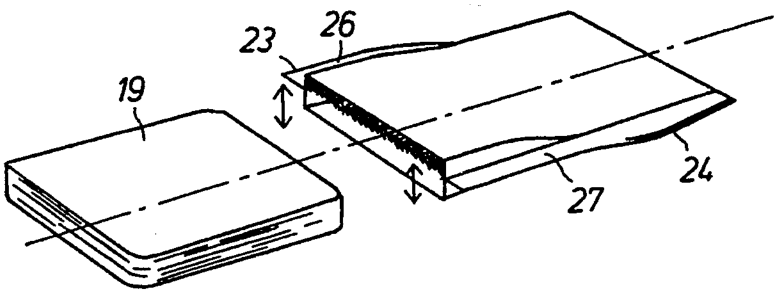
Figure 2D:
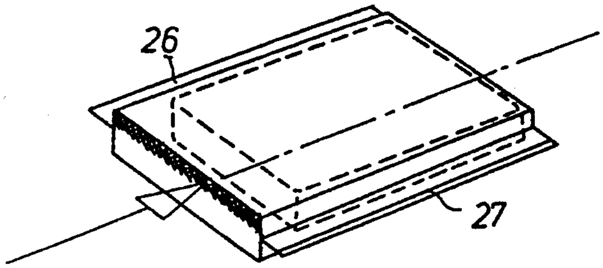
Figure 2E:
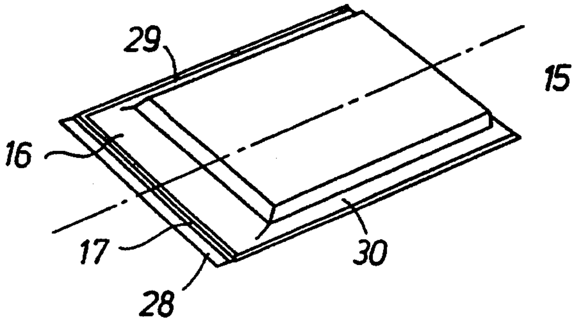

FIGS. 2*a* to 2*e* show the first stage of the manufacture, viz. the wrapping of a stack of the sheets in a bag. FIG. 2*a* shows very schematically how a stack 19 of X-ray film sheets and a stack 20 of empty wrapping bags 21 are located on their respective positions in a film wrapping machine. The wrapping bags may suitably have been formed by the folding of a sheet of wrapping material about is transverse axis and next the sealing of its lateral extremities to each other to form seals 23 and 24, leaving one end of the bag unsealed for insertion of the film stack. FIG. 2*b* that shows the dispensing of the upper bag from the stack to bring it in longitudinal alignment with the film stack. FIG. 2*c* shows the opening of the unsealed end of the flap of the bag by any means known in the art such as suction means, grippers, etc. The longitudinal marginal portions 26 and 27 of the bag inside of the seals 23 and 24 are kept clamped together so that an opened bag with almost rectangular cross-section is obtained. FIG. 2*d* shows the introduction of the film stack into the opened bag. The inner dimensions of the opened bag are such that the insertion of the film stack therein can occur freely without any problem. FIG. 2*e* shows the evacuation of the air from the bag in order to substantially remove the air therefrom and to create fold lines in that bag along ciecumference of the stack, and next the airtight sealing of the free extending flap 16 according to a sawtooth-like pattern 17. The sealing is preferably done by means of heated sealing clamps having a sealing pattern as shown on the figure and causing the melting of an interior polyethylene layer of the bag.

Seal 17 is located somewhat inward of the free edge of the flap end of the bag, so that a free margin 28 with two coinciding plies of the bag is available that can be gripped for opening the package.

The evacuation of the air from the film pack just formed causes the extending portions of the bag that surround the film stack at three sides to collapse thus forming two side flaps 29 and 30 that are wider than the flaps 26 and 27 and the closure flap 16.

The folding of the collapse margins of the bag is described hereinafter with reference to FIGS. 3*a* to *f*, FIG. 3*a* being an enlarged view of FIG. 2*e*.

Figure 3A:
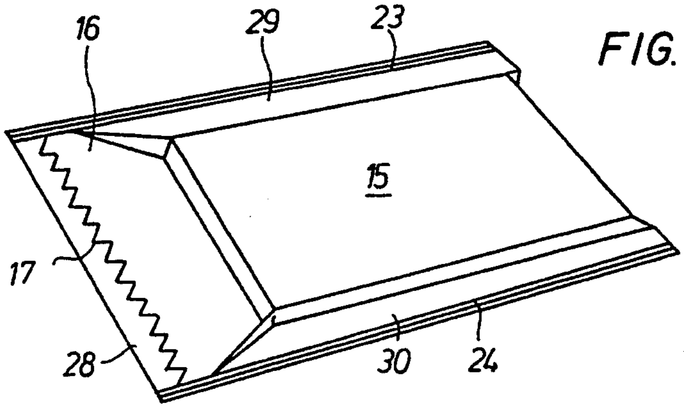
FIG. 3 shows the preparation of the film pack for enclosure in an outer carton.
Figures 2, 3B:
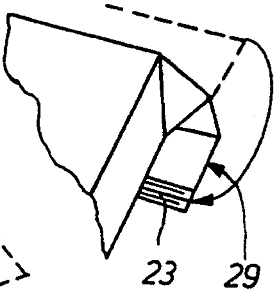
Figures 1, 3B:
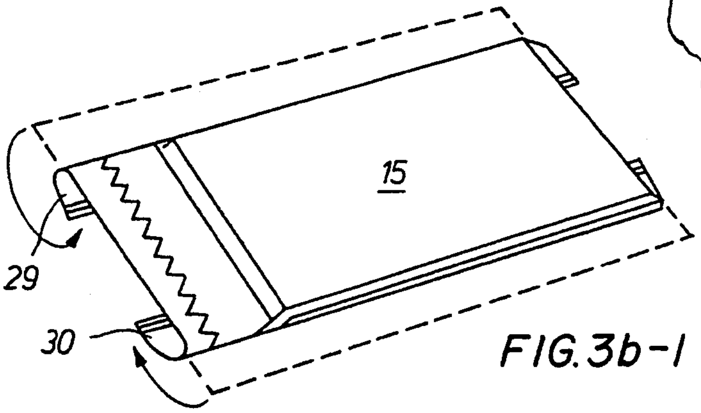

Referring to FIG. 3*b*, side margins 29 and 30 are folded under the film pack whereby end configurations at the bottom end of the pack are formed as shown in detail by the perspective view of the bottom end of margin 29.

Figure 3C:
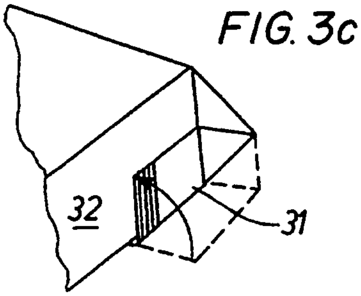
Figure 3E:
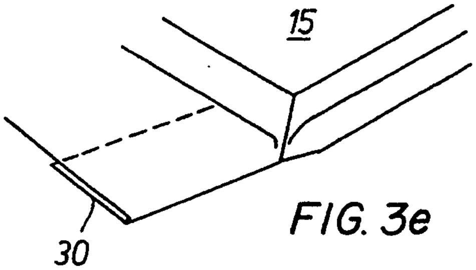
Figure 3D:
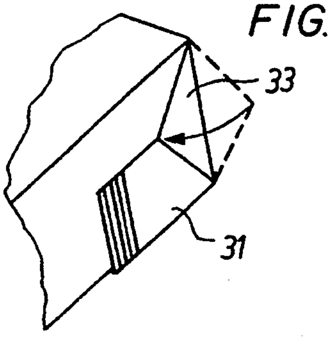

FIG. 3*c* shows the folding of the free extending end portion 31 of margin 29 against the bottom side 32 of the film pack whereas FIG. 3*d* shows the folding of the remaining free extending triangular portion 33 of margin 29 against the bottom of the film pack over margin portion 30.

Figure 3F:
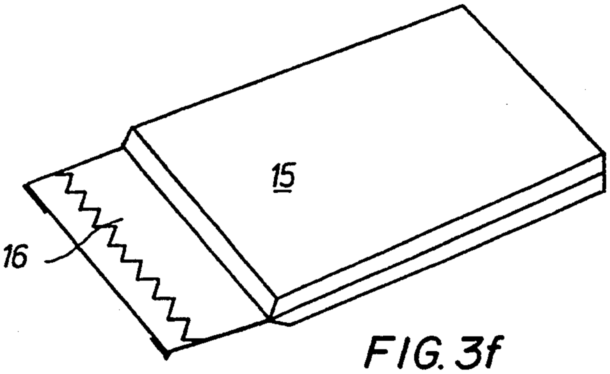

The folding of the portions of the side margins 29, 30 at the location of the closure flap 16 occurs according to slightly tapering directions, see the folding of margin 30 in FIG. 3*e*, so that closure margin 16 finally obtains a slightly tapering configuration as shown in FIG. 3*f*.

The means for carrying out the different folding operations described hereinbefore have neither been described, nor illustrated in the drawings since these means belong to the common knowledge in the packaging industry.

The enclosure of the closed film pack in a wrap around carton is shown in FIGS. 4*a* to *d*.

FIG. 4*a* shows how a one-piece blank 34 is laterally fed in the direction of arrow 35 to lie in a position in which a film pack 15 can be placed on the blank, see FIG. 4*b*. The blank has a rear panel 38 having on opposite sides side panels 39, 40 connected along fold lines 41, 42, a front panel 43 having on opposite sides side panels 45, 46 connected along fold lines 47, 48, a bottom end panel 49 connected along fold lines with the rear and front panel respectively and a top end panel or flap 13 connected along a fold line 9 with the rear panel and having a tab 14 for keeping it closed.

Blank 34 is finally provided adjacent the top ends of its rear, front and side panels with weakened lines 51 and 52 that together will form the circumferential weakened line 18 of the completed container.

FIG. 4*c* shows the folding of the rear panel 38 of the blank over the film pack 15, and FIG. 4*d* the folding of the top panel 13 together with the closure tab 16.

Finally, corresponding side panels of the blank are provided with a hot melt adhesive and next applied onto each other.

The finished package looks as shown in FIG. 1. The closed carton is preferably provided with an identification label, and a sealing label joining the top and front panel 13 and 38.

At first use of the package, the operator destroys the seal of the top panel 13 of the carton in the darkroom, opens the top panel and partly withdraws the film pack from the carton through opening 12 to enable flap 16 to be unfolded. He grips the free marginal portions 28 of the flap and progressively pulls open the seal 17. Then he can remove any cardboard panels from the top and the bottom of the film stack, if there are such panels, in order to give the film sheets more freedom in their bag wrapping and then he can take out the required number of film sheets.

Thereafter the operator folds flap 16 back over the front of the pack and reinserts the film pack in the carton thereby to keep the flap tightly clamped against the film pack. Closure of top panel 13 by means of closure flap 14 provides extra protection against undesired exposure of the film sheets to ambient light. The package can not be stored in daylight conditions.

Re-opening of the package for each successive loading operation of a cassette can be avoided if so-called bins are used in the darkroom. In that case an entire upper portion of the carton is removed by tearing it away along weakened line 18, so that in fact an open-ended box is obtained. The film pack is taken out, the bag is removed from the film stack and next the film-stack is re-introduced in the open-ended box for keeping the films together in the bin.

The inventive filmpackage was manufactured for standard film formats measuring 13×18 cm up to 35×43 cm, for stacks comprising 100 non-interleaved X-ray films.

The invention is not limited to the embodiment described hereinbefore.

The carton of the package read not necessarily be provided with a weakened circumferential line for facilitating the removal of a top portion from the carton.

The carton can be provided with a tearstrip for facilitating the tearing away of a top portion from the carton.

The bag can be made from other materials that are light- and airtight, for instance metallized polyester foil, lined with black polyehylene.

We claim:

1. A reclosable film package comprising:

1) A filmpack formed of a multiplicity of rectangular film sheets arranged in a stack having upper and lower faces, two opposed sides, and two opposed ends, said stack being contained within a bag of flexible light-tight wrapping material comprising upper and lower panels joined along opposite sides and one end to define a bag fitting around the sheet stack, extensions on said panels at an end opposite said one end, said extensions projecting beyond a corresponding stack end to constitute a foldable tubular flap on said bag opposite said one end, said extensions terminating in free edges and having generally adjacent said free edges sealing means for light-tightly sealing said tubular flap, said sealing means being unsealable to open said tubular flap of the bag for removal of film sheets from said bag through the thus-opened flap end while the remainder of the sheet stack remains intact within the bag, the unsealable sealing means being a peelable seal, said tubular flap being folded over a portion of the bag in overlying relation to one of said panels of the bag and being re-foldable thereover after removal of film sheets from the bag from the unsealed flap; and 2) A rectangular carton for enclosing the filmpack in generally close-fitting relation, said carton having upper and lower faces, opposed side walls, a bottom end wall, and at an end opposite said bottom end wall a top end closure flap connected along a hinge line to an edge of one of the carton faces, which edge is opposite said bottom end wall, and being adapted to be pivoted along said hinge line from and to a closed position closing the top end of the carton and to and from an open position opening that end for sliding withdrawal through the thus-opened end of the filmpack from the carton sufficient to allow the folded tubular slap of said bag to be accessed and unsealed to open said flap for removal of film sheets from the bag end and for return within the carton of the opened filmpack with the tubular flap in its re-folded position and being held by the carton in said re-folded position in said overlying relation to said one panel of the bag.

2. The film package of claim 1 wherein said carton is set up from a one-piece blank.

3. The film package of claim 1 wherein said peelable seal has a generally sinuous configuration to facilitate the unsealing of the seal on said extensions to open the tubular flap.

4. The film package of claim 1 wherein the seal is located in spaced relation to the free ends of said extensions to provide the extensions with free margins adapted to be gripped for unsealing of the seal.

5. The film package of claim 1 wherein said top end closure flap has a locking tab insertable within the carton to maintain the closure flap in its closed position.

6. The film package of claim 1 wherein each of said faces and side walls of the carton are weakened along coincident transverse lines spaced from an edge thereof at the top end of the carton whereby portions thereof between the weakened lines and the top end edges of the faces and side walls can be removed in entirety to permanently open the carton top end with a top end portion of the filmpack projecting therethrough.

7. The film package of claim 1 wherein the longitudinal and transverse dimensions of said panels are substantially greater than longitudinal and transverse dimensions of the film sheet stack whereby said bag has opposite side margins extending beyond said opposed sides of the stack and an end margin at the end of the bag opposite said tubular flap extending beyond the corresponding end of said stack, the thus-extending opposite side margins of the bag being folded mutually toward one another and the end margin being folded toward the opposite end to cause said bag to fit closely around said stack.

8. The film package of claim 7 wherein air within the sealed filmpack is substantially removed to collapse the extending opposite side margins and top end of the bag to a generally flat condition.

* * * * *